United States Patent [19]
Ditto et al.

[11] 4,076,296
[45] Feb. 28, 1978

[54] ENERGY ABSORBING BUMPER

[75] Inventors: Edwin D. Ditto, Bloomfield Hills; A. Hadi Kobaisi Abu Akeel, Sterling Heights, both of Mich.

[73] Assignee: General Motors Corporation, Detroit, Mich.

[21] Appl. No.: 706,850

[22] Filed: Jul. 19, 1976

[51] Int. Cl.² .............................................. B60R 19/08
[52] U.S. Cl. ...................................... 293/71 R; 293/97
[58] Field of Search .................... 293/70, 71 R, 97, 98, 293/85, DIG. 5; 267/47

[56] References Cited
U.S. PATENT DOCUMENTS

| 1,247,142 | 11/1917 | Parradee | 293/70 |
| 3,376,033 | 4/1968 | Sherwood | 267/47 |
| 3,883,168 | 5/1975 | Goupy et al. | 293/98 |

FOREIGN PATENT DOCUMENTS

| 974,763 | 2/1951 | France | 293/70 |
| 1,322,005 | 2/1963 | France | 293/98 |

Primary Examiner—Trygve M. Blix
Assistant Examiner—Edward M. Wacyra
Attorney, Agent, or Firm—K. H. MacLean, Jr.

[57] ABSTRACT

A low-cost, easily fabricated bumper structure for the alleviation of repeated, low-magnitude impact shocks on a vehicle. The bumpers utilize structural elements of fiberglass or similar lightweight, high-strength materials to absorb energy of impact. The fiberglass elements of the subject bumper are fabricated by relatively inexpensive manufacturing processes, such as molding, pull-truding or extruding.

2 Claims, 11 Drawing Figures

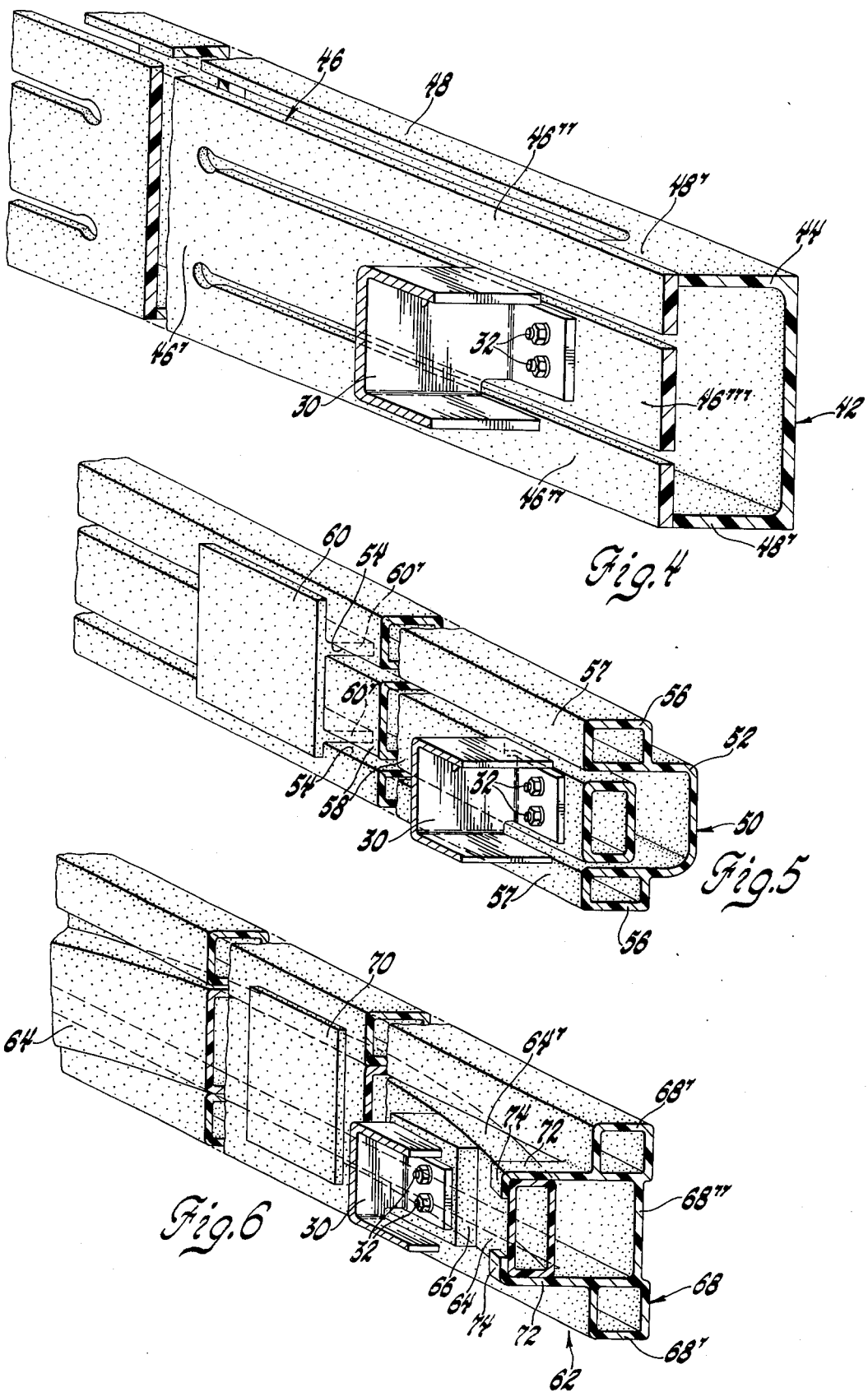

ENERGY ABSORBING BUMPER

Heretofore, energy absorbing bumper structures for vehicles commonly have used damper means or special energy dissipating devices between the vehicle frame and the bumper structure to receive impact energy from the bumper and dissipate the energy prior to its transmission to the frame of the vehicle. The use of separate energy-dissipating devices adds weight to the vehicle and makes the fabrication of the bumper assembly more complex and costly.

The present invention utilizes lightweight, high-strength fiberglass or similar materials in structural shapes which are easily fabricated and assembled. The lightweight, high-strength structural shapes are assembled together to provide a bumper structure to absorb low-magnitude impact shocks on the vehicle. The bumper structure is attached to the vehicle frame at two points near opposite end portions of the bumper structure. Impacts near the end portions, as well as impacts near the midportion, of the bumper structure must be absorbed by a bumper for successful operation. The embodiments described hereinafter are designed to produce the impact-absorbing function.

Therefore, an object of the present invention is to provide a lightweight, high-strength bumper structure for a vehicle utilizing material formed into simple structural shapes and assembled together to absorb low-magnitude impact shocks.

A further object of the present invention is to provide a lightweight, high-strength bumper structure for a vehicle utilizing a number of structural elements having a relatively constant cross-section which is easily fabricated from fiberglass or similar material by relatively inexpensive manufacturing methods, such as molding, pulltruding or extruding.

A still further object of the present invention is to provide a lightweight, high-strength bumper structure for a vehicle made up of diverse structural elements of fiberglass or similar material assembled so as to absorb both impacts on the end structure of the bumpers adjacent bumper mounts and impacts on the mid-portion of the bumper structure between the mounts.

Still further objects and advantages of the present invention will be more readily apparent from the following detailed description of preferred embodiments, reference being had to the accompanying drawings in which the embodiments are illustrated.

IN THE DRAWINGS

FIGS. 4–11 are views similar to FIG. 3 of other embodiments of the present invention.

Figure 1:
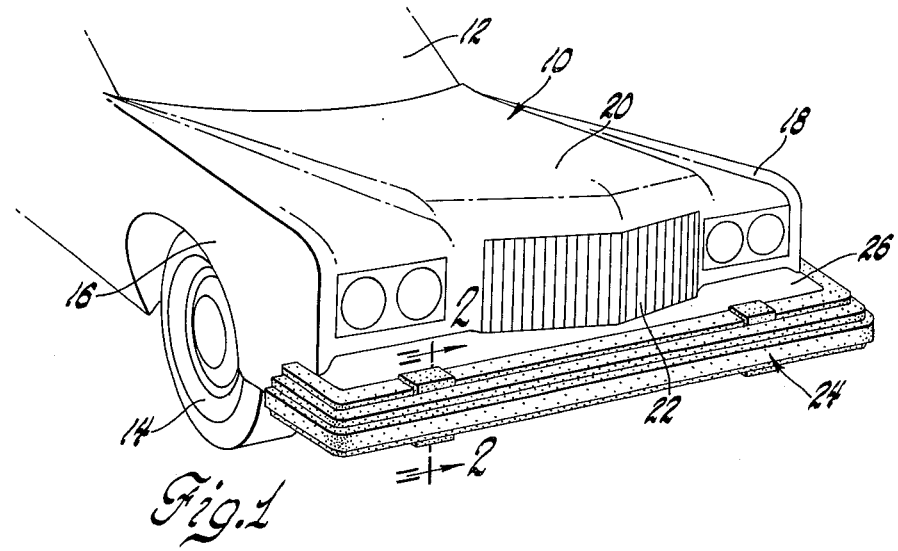
FIG. 1 is a partial and perspective view of the front portion of a vehicle having the subject bumper structure.

In FIG. 1 of the drawings, an automobile 10 is illustrated. The automobile 10 includes a windshield 12, wheels 14 (only one of which is visible), right and left fender quarters 16, 18, hood 20, grille 22 and the subject bumper structure 24. It should be noted in FIG. 1 that a fill panel 26 is located between the bumper structure 24 and the remaining body portion of the automobile 10 for appearance purposes only.

Figure 2:
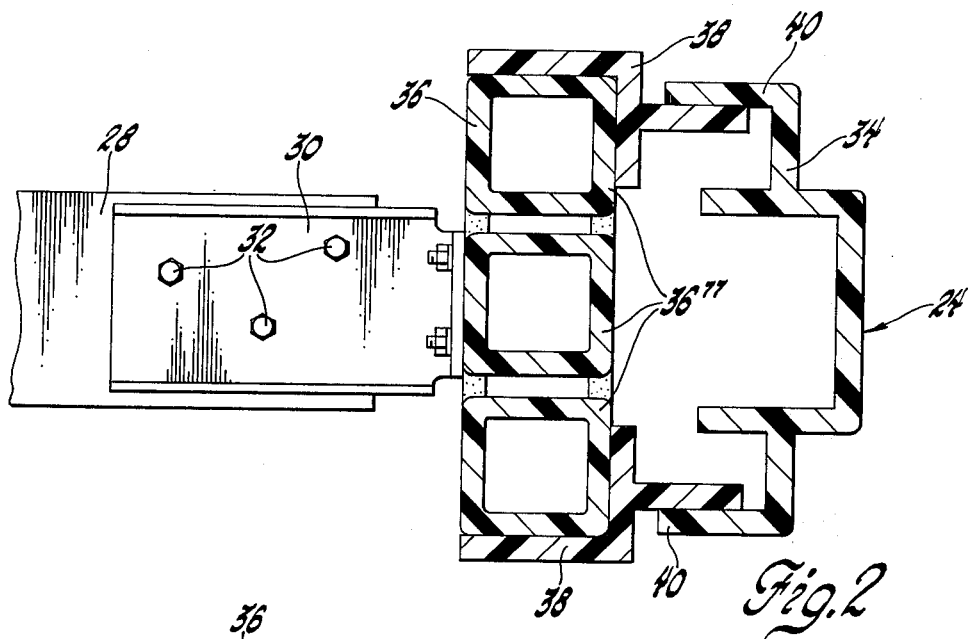
FIG. 2 is a sectional view of the bumper structure taken along section line 2—2 in FIG. 1 and looking in the direction of the arrows.
Figure 3:
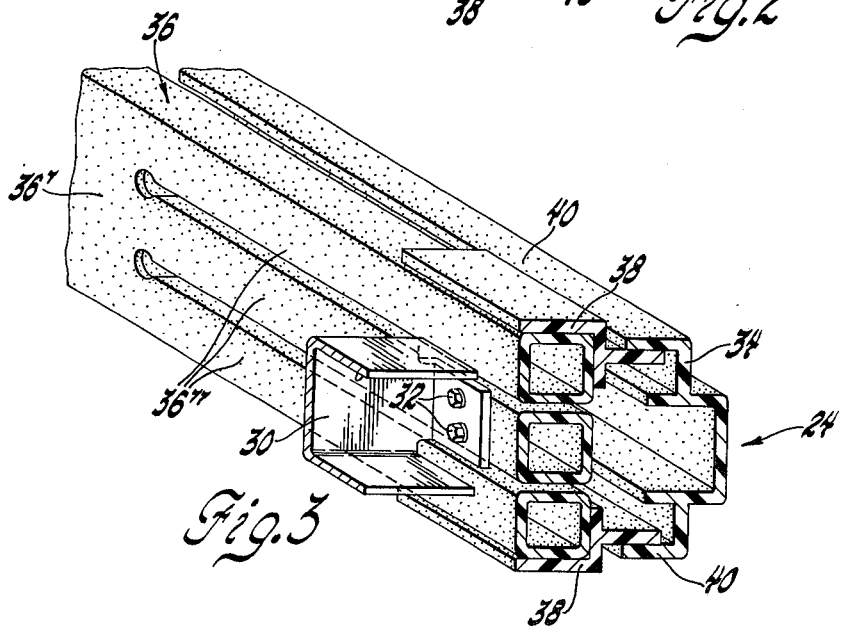
FIG. 3 is a fragmentary perspective sectioned view of the bumper structure shown in FIG. 2.

The bumper structure 24 shown in FIG. 1 is better shown in FIGS. 2, 3 in which a portion 28 of the vehicle frame is visible. The bumper structure 24 is attached to frame 28 by means of a bracket member 30, also shown in FIGS. 2, 3. Fastener means 32 attach the bracket 30 to the frame and the bumper structure 24. Specifically, the bumper structure 24 includes a number of distinct structural elements assembled together to provide a low-cost, lightweight and high-strength structure. An outer or first beam 34 is attached to an inner or second beam 36 by means of four coupling elements 38 (two of which are at either end of the bumper and are visible in FIGS. 2, 3). The four coupling elements 38 are interposed between beams 34, 36 in pairs adjacent the support attachment of beam 36 to the bracket 30. It should be understood that the bumper structure 24 is adapted to be attached to two frame members 28, each located near the end portion of the beam 36. Thus, pairs of the coupling elements 38 are located adjacent the brackets 30.

As is best shown in FIG. 3, the beam 36 is an elongated member having a box-like mid-section 36' and trifurcated end portions 36". The end portions 36" have box-like cross-sections, as is visible in both FIG. 2 and FIG. 3. The beam 36 is easily formed by a molding operation into two sections which subsequently are joined at the mid-portion. The bracket 30 is attached by fasteners 32 to the central portion of the trifurcated end portions 36". An adhesive bond could also be used. Couplers 38 of fiberglass or similar material are attached to the outer of the end portions 36" with portions extending toward the wide walls 40 of beam 34 and attached thereto. The attachment of the couplers 38 and beams 34, 36 may be conveniently made by fasteners or more conveniently by bonding with adhesive, such as fiberglass resin or the like.

When the bumper structure 24 is impacted in a central location somewhere between the two mounting locations, the impact causes bending of beam 34 and also transmission of energy from beam 34 through couplers 38 to the outer end portions 36". Hence, the portions 36" are deflected and energy transferred through the central section 36' of beam 36 to the middle end portion 36". The beams thereby absorb a good portion of the impact energy by their deflection. The aforedescribed deformation of the structural elements of the bumper under impact load is only momentary and the bumper elements return to their unstressed shape subsequent to the impact.

When the bumper structure 24 is impacted near the mounting locations of the bumper structure, deformation of beam 36 is initiated by energy transfer through couplers 38. The outer end portions 36" are deflected toward the vehicle and a load is placed on the middle portion 36" of beam 36. Subsequent to the side impact load, the structural members return to their original orientation.

In FIG. 4, a second embodiment 42 of the invention is illustrated, including support members as in FIG. 3, such as bracket 30 and fasteners 32. A channel-shaped first beam 44 extends across the front of a vehicle and is attached to upper and lower end portions 46" of a trifurcated second beam 46 which also extends laterally across the front of the vehicle. A central end portion 46" of the beam 46 is attached to bracket 30 and, hence, to the vehicle frame. The beam 44 includes side wall portions 48 which are spaced from the beam 46 along the midportion of the bumper. Adjacent the two brackets 30 which attach the bumper structure to the frame, the side wall portions 48 of beam 44 are extended by portions 48' into engagement with the outer end portion 46" of beam 46 and are attached or bonded thereto. Beam 46 is similar to the beam 36 shown in FIGS. 2 and 3 and includes a midportion 46' between the mounting locations.

When the bumper structure 42 is subjected to a central impact, the beam 44 is deflected near its midportion and forces are transmitted through end portions 48' to the upper and lower portions 46" of beam 46. These end portions 46" deflect and transmit forces through the midportions 46' to the central or middle end portion 46''', thus further causing deflection and absorption of energy. When the impact force is past, the elements spring back to their original configuration.

In FIG. 5, a bumper structure 50 is illustrated and adapted to be attached to the frame member of the vehicle by bracket 30 and fasteners 32 in a manner shown in FIGS. 2, 3. A forward channel-shaped beam 52 extends laterally across the front of the vehicle in the same manner as shown in FIG. 1. Box-like formations 56 are formed above and below the midportion of beam 52 and are integrally connected. Rearwardly facing surfaces 57 are formed on the formations 56. A second beam 58 of simple box-shaped cross-section extends laterally across the forward portion of the vehicle in substantial parallelism with beam 52. Both beams 52 and 58 have constant cross-sectional configurations which can be easily fabricated by extrusion. The top and bottom portions of a coupler 60 are fastened to the surfaces 54 of beams 52, and the midportion of the coupler 60 is fastened to the rear surface of beam 58. The coupler 60 may be attached to the beams 52, 58 by screw fasteners or by adhesive bonding, as previously suggested in the discussion of the embodiment shown in FIGS. 2, 3. It should be noted that in the embodiment shown in FIG. 5, the coupler 60 includes forwardly extending leg portions 60' which space the portions 56 of beam 52 and the beam 58. It should be noted in this embodiment that the beams 52, 58 are attached together only by one coupler which is located at the midportion of the bumper structure.

Energy resulting from a center impact is transmitted directly from beam 52 through coupler 60 to the midportion of beam 58, which deflects to alleviate the impact. Impacts located near the end portions of the bumper structure 50 cause the beam 52 to deflect and result in a force transmission to the midportion of beam 58 through coupler 60.

In FIG. 6, embodiment 62 is illustrated, which utilizes a central beam 64 which is molded or preset into a curved shape, as illustrated. The end portions 64' of beam 64 are attached, preferably by adhesive, to a semirigid rubber cushion member 66 between the bracket 30 and the beam 64. Fasteners 32 secure the bracket 30 to the beam 64 in the manner previously illustrated and explained in connection with the embodiment shown in FIGS. 2, 3. A second beam 68 is utilized and has an extrudable cross section with top and bottom box sections 68' joined by a middle portion 68". A cavity formed between the box sections 68' accommodates the beam 64 therebetween. One coupling element 70 is fastened at upper and lower portions to the box sections 68' and at a midportion to the beam 64. The coupler 70 may be fastened to the beams 64, 68 by adhesive bonding, as previously explained, or by conventional fasteners. Retaining strap portions 72 extending from the ends of the beam 68 extend rearward toward the vehicle and have turned end portions 74 which engage the ends of the curved beam 64. Prior to assembling beam 68 to beam 64 by the retainer 72, the end of beam 64 is deflected toward the beam 68 so that the bumper apparatus 62 and beam 68 are preloaded. This increases the load-absorbing capacity of the bumper apparatus without requiring the use of larger elastic deflections of its members.

When the bumper structure 62 is subjected to a central impact in the vicinity of the coupler 70, the impact force or energy is transmitted to the midsection of beam 64, which is deflected inward toward the vehicle, thus retrievably absorbing energy of impact. The preset curved shape of the beam 64 helps resist the aforesaid deflection and thus permits greater energy absorption than would be the case if the beam were not precurved. When the beam 62 is impacted near the end portions in the vicinity of the mount, the end portions and, in particular, box section 68', are deflected rearward, thus absorbing a portion of the impact energy. Simultaneously, the center portion of the beam 64 is deflected rearward due to the transfer of forces through the coupler 70.

Figure 7:
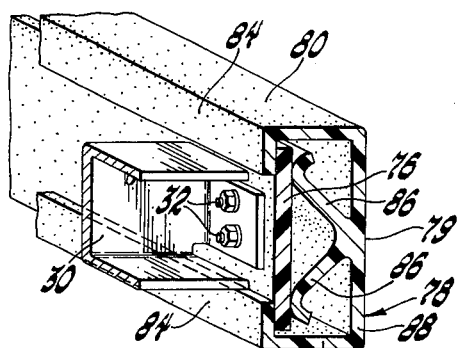

FIG. 7 shows still another embodiment of the invention utilizing extrudable fiberglass or like material. Bracket 30 is connected by fasteners 32 to a flat, straight beam 76 which extends laterally across the front of the vehicle. Another beam 78 extends substantially parallel to beam 76 and has a front face 79 and rearwardly extending top and bottom wall portions 80, 82, respectively. Edge portions 84 extending from walls 80, 82 engage the rear face of the first beam 76. Both beams 76, 78 may be made of fiberglass material by an extrusion process.

Beam 78 in cooperation with beam 76 forms a composite box-like cross-sectional structure. Within the interior of the composite beam, curved spring means 86 are located which may be integrally formed with beam 78. The spring means 86 extends from the front wall 88 rearward and toward edge portions 84. The spring means 86 in a preferred embodiment are integrally formed with the beam 78 by extrusion and one edge of the spring 86 is fastened or supported by the wall 88 while the other edge portion is unattached so that it is free to move outward and toward the front wall 88 of beam 78. In assembled position, the movable free edge engages the front face of beam 76.

When the bumper structure is subjected to an impact force, the beam 78 moves rearward toward the car body, causing the curved spring 86 to be flexed in a vertical direction and toward the wall 88 of beam 78. When the impact force is past, the spring means 86 returns beam 88 to its original position spaced from beam 76. Also, when the bumper structure is subjected to a centrally located impact, the deflection of beam 78 toward beam 76 also flexes the midportion of the beam 76 and further absorbs impact energy. It should be noted that the beam 78 and curved spring means 86 may be made in two separate parts by disallowing the bond between the two beams at the center section of spring means 86. Also, the separate spring member could be given a preset curvature in the manner illustrated in FIG. 6, so that the force between the beams 76, 78 is made greater. With a given integrally extruded beam 78 and spring means 86, the preload may be varied by changing the thickness of beam 76.

Figure 8:
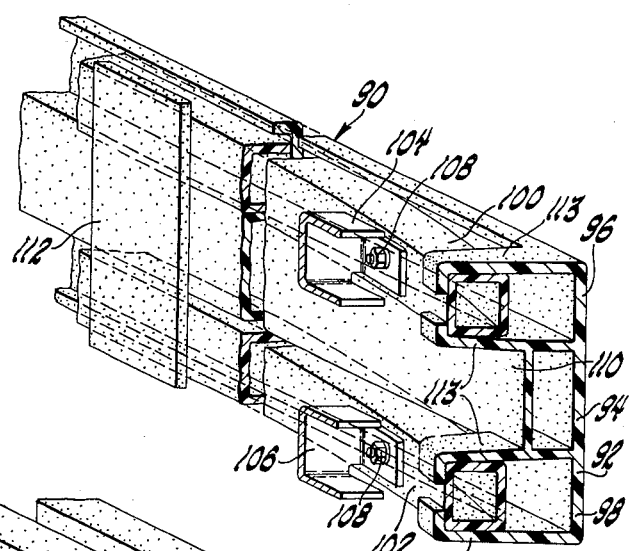

In FIG. 8, a bumper structure 90 is shown, which is similar to the structure shown in FIG. 5. One beam 92 has a central box-like section 94 with upper and lower edge portions 96, 98 extending therefrom. Two beams 100, 102 are fastened to mounting brackets 104, 106 by fasteners 108 at both ends. The brackets 104, 106 are adapted to be attached to the frame of the vehicle in the manner shown in FIG. 2. Beams 100, 102 are precurved and prestressed in the manner previously discussed in connection with the embodiment shown in FIG. 6. The beam members 100, 102 and the rear surface 110 are fastened together by a coupler member 112 by bonding or other similar connection means, as previously discussed. When the structure is subjected to a central impact force, the midportions of both beams bend or deflect simultaneously to absorb energy in a retrievable manner. When the structure is subjected to an impact force near the ends of the bumper adjacent the mounting location, beam 92 is deflected toward beams 100, 102 and the impact force is also transmitted through coupler 112 to the midportions of the beams 100, 102. Retainers 113 similar to retainers 72 in FIG. 6 are used.

Figure 9:
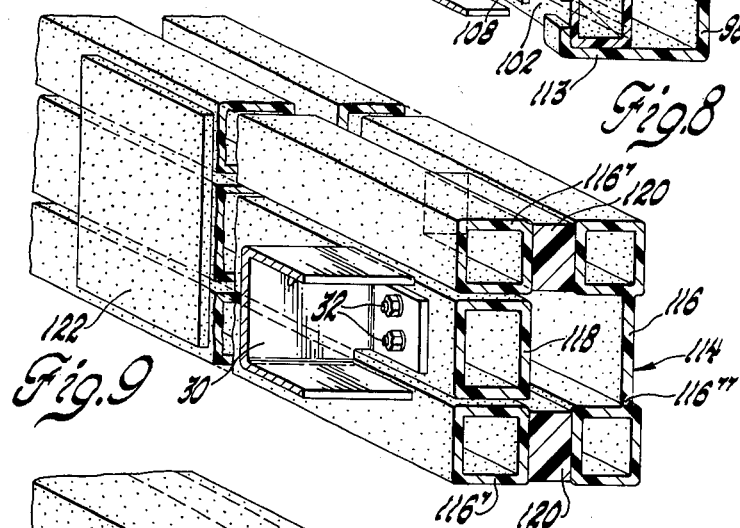

In FIG. 9, another bumper 114 is illustrated. The bumper 114 includes extruded beam elements of rectangular cross section which are joined together to form beams 116 and 118. The forwardly positioned beam 116 is formed by three extruded members, two being box-shaped channel members 116′ and the third being a composite beam 116″ similar to beam 68 in FIG. 6. The two box-like channel portions 116′ and the other portion 116″ of beam 116 are spaced at both ends by strips 120 of elastomeric material and bonded together in a manner similar to that of element 38 of FIG. 3. This method of fabrication allows for greater elasticity and, hence, reduces stresses between the portions of the beam. Beam 118 is joined to the frame of the automobile by bracket 30 and fasteners 32 in the manner previously described. A coupling member 122 is attached to the midportion of the beams 116, 118 so that central impact forces are transmitted from the beam 116 to beam 118, causing the beams to deflect together and absorb energy in a retrievable manner. End impact forces are primarily absorbed by the deflection of beam 116 with respect to the end of beam 118 and forces are also transmitted through coupler 122 from beam 114 to the midportion of beam 118.

Figure 10:
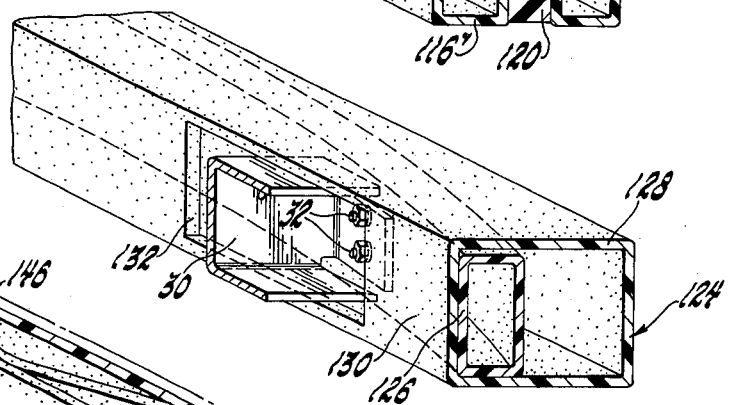

Another bumper embodiment 124 is illustrated in FIG. 10. Embodiment 124 includes two hollow box beams 126, 128. Beam 126 extends through the interior of the outer beam 128 and also may be preset in a curved shape in a manner which has been previously discussed with reference to the embodiment of FIG. 6. The rear wall 130 of beam 128 has been apertured near both ends of the beam 128 to form windows 132 through which brackets 30 extend and are attached by fasteners 32 to beam 126 in the manner previously discussed. The beam 126 is preset into a curved shape within the beam so that its midportion contacts the front face of the beam 128. When subjected to a centrally located impact force, the energy is transmitted from beam 128 to the midportion of beam 126 which is deflected to retrievably absorb the energy. When subjected to a side impact force, the ends of the beam 128 are deflected toward the car to absorb impact energy. Also, the midportion of beam 126 is flexed inward to absorb additional energy.

Figure 11:
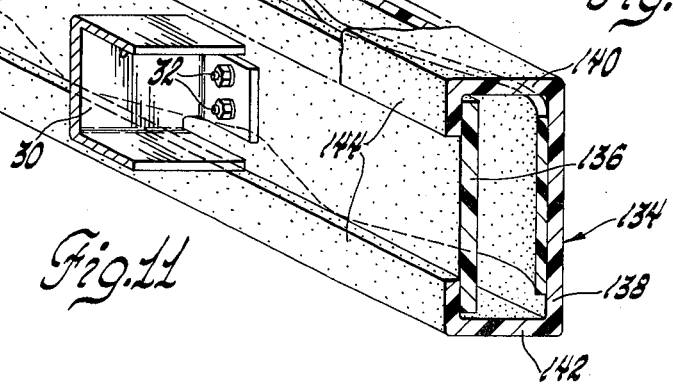

In FIG. 11, a bumper structure 134 is illustrated. The bumper 134 includes a flat beam 136 which is attached to the vehicle by brackets 30 and fasteners 32 in the manner previously discussed in relation to the other embodiments. A second beam 138 extends in substantial parallelism with the first beam 136 and has a partially closed channel-shaped cross section similar to the beam 80 shown in FIG. 7. Specifically, beam 138 has top and bottom walls 140, 142 and edge portions 144 which contact the top and bottom edges of the beam 136. A sinusoidally shaped strip spring member 146 is interposed between the beams 136 and 138 and normally spaces the beams. When subjected to a centrally located impact force, the member 146 transfers forces to the midportion of beam 136 which deflects to absorb energy in a retrievable manner. Beam 146 also flattens and absorbs additional energy. When subjected to a side impact force in the vicinity of bracket 130, the end portion of beam 138 is deflected toward beam 136, thereby compressing or flattening the spring member 146.

Although the embodiments illustrated are preferred embodiments, it is understood that other embodiments may be contemplated which fall within the scope of the following claims which describe the invention.

What is claimed is as follows:

1. A lightweight bumper structure for a motor vehicle having multiple elongated elements which are elastically deflected to absorb energy resulting from low magnitude impact before their transmission to the vehicle frame, comprising: first and second elongated beam members extending laterally in a generally horizontal direction across the end of the vehicle; both opposite ends of said second beam being separated into adjacent first and second axially extending end portions joined at an inward location toward the midportion of said second beam member to permit individual flexing of said portions out of the beam plane; mounting means between the vehicle frame and said first end portions; coupling means between said first beam member and said second end portion of the second beam member to normally space said beam members and yieldably mount said first beam member with respect to said second beam member by the allowed flexure between said first and second end portions; said beams being of strong, lightweight material, such as fiberglass, which elastically deflects when subjected to relatively low magnitude impacts, thus absorbing energy in a retrievable manner so that after the impact, beam members return to their original configuration; said first beam member being arranged forward of said second beam member so as to simultaneously react by deflection to impact forces and then transmit a reaction force on said second beam member for further absorption of the impact forces.

2. A lightweight bumper structure for a motor vehicle having multiple elongated elements, portions of which are elastically deflected sequentially one with respect to the other to absorb energy resulting from low magnitude impacts before their transmission to the vehicle frame comprising: a first elongated beam member extending laterally in a general horizontal direction across the end of the vehicle and defining a midportion and integrally joined opposite end portions; mounting means between the vehicle frame and the opposite end portions of said first beam member; a second elongated beam member extending adjacent said first beam and also extending laterally with respect to the first beam member in a generally horizontal direction across the end of the vehicle and defining a midportion and integrally joined opposite end portions; a coupling bracket between said first and second beam members located inward from their opposite end portions to establish a normal spatial relationship between said beam members; said first beam member being preformed into an arcuate configuration having a nonlinear axis with respect to the axis of the second beam member and with its opposite end portions spaced toward the vehicle body from the opposite end portions of said second beam member so that when the opposite end portions of the second beam member are impacted, the opposite end portions of the second and of the first beam members sequentially move toward the vehicle body so that the composite beam structure is capable of smoothly resisting impact-produced deflections to a greater degree than with preformed linear beam members; said beams being of strong, lightweight material, such as fiberglass, which elastically deflects when subjected to relatively low magnitude impacts, thus absorbing energy in a retrievable manner so that after the impact, beam members return to their original configuration; the end portions of said second beam member being arranged forward of said first beam member so as to simultaneously react by deflection to impact forces toward said first beam member and then after a given deflection, transmit a reaction force directly to the opposite end portions of said first beam member for further absorption of the impact forces.

* * * * *